US010078693B2

(12) United States Patent
Brown et al.

(10) Patent No.: US 10,078,693 B2
(45) Date of Patent: Sep. 18, 2018

(54) PEOPLE SEARCHES BY MULTISENSOR EVENT CORRELATION

(75) Inventors: Lisa Marie Brown, Pleasantville, NY (US); Arun Hampapur, Norwalk, CT (US); Zuoxuan Lu, Yorktown Heights, NY (US); Sharathchandra U. Pankanti, Manhasset, NY (US); Andrew William Senior, New York, NY (US); Chiao-Fe Shu, Scarsdale, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 11/454,819

(22) Filed: Jun. 16, 2006

(65) Prior Publication Data
US 2007/0294207 A1 Dec. 20, 2007

(51) Int. Cl.
*G06F 17/30* (2006.01)

(52) U.S. Cl.
CPC .. *G06F 17/30793* (2013.01); *G06F 17/30831* (2013.01)

(58) Field of Classification Search
USPC ............... 707/1–10, 737; 705/1–10
See application file for complete search history.

(56) References Cited

U.S. PATENT DOCUMENTS

| 3,709,121 | A | 1/1973 | Simonson et al. |
| 5,745,036 | A | 4/1998 | Clare |
| 5,794,207 | A * | 8/1998 | Walker et al. ............. 705/1 |
| 5,956,081 | A | 9/1999 | Katz et al. |
| 6,191,613 | B1 * | 2/2001 | Schultz et al. ............. 326/39 |
| 6,698,021 | B1 * | 2/2004 | Amini et al. ............. 725/105 |
| 6,809,645 | B1 | 10/2004 | Mason |
| 6,847,393 | B2 | 1/2005 | Ashe et al. |
| 7,286,158 | B1 * | 10/2007 | Griebenow ........ G07C 9/00103 340/505 |
| 7,911,346 | B1 | 3/2011 | Claudatos et al. |
| 2003/0227392 | A1 | 12/2003 | Ebert et al. |
| 2003/0231769 | A1 | 12/2003 | Bolle et al. |
| 2003/0233278 | A1 * | 12/2003 | Marshall ............. 705/14 |
| 2004/0111324 | A1 | 6/2004 | Kim |
| 2004/0164863 | A1 | 8/2004 | Fallin et al. |
| 2004/0249650 | A1 * | 12/2004 | Freedman et al. ........ 705/1 |
| 2005/0165667 | A1 | 7/2005 | Cox |
| 2005/0177859 | A1 | 8/2005 | Valentino, III et al. |
| 2005/0185823 | A1 * | 8/2005 | Brown et al. ............. 382/103 |
| 2006/0004579 | A1 * | 1/2006 | Claudatos et al. ....... 704/270 |
| 2006/0089837 | A1 * | 4/2006 | Adar et al. ................. 705/1 |
| 2006/0227997 | A1 | 10/2006 | Au et al. |
| 2007/0182818 | A1 * | 8/2007 | Buehler ................. 348/143 |

(Continued)

FOREIGN PATENT DOCUMENTS

WO WO 03/049057 6/2003

*Primary Examiner* — Mark D Featherstone
*Assistant Examiner* — Navneet Gmahl
(74) *Attorney, Agent, or Firm* — Tutunjian & Bitetto, P.C.; Rabin Bhattacharya

(57) ABSTRACT

A data indexing system and method includes acquiring activity data in a context and indexing the activity data in accordance with contextual conditions. The activity data is stored in accordance with indices. An event is correlated with the activity data by using the indices to review the activity data in the context.

8 Claims, 3 Drawing Sheets

(56) References Cited

U.S. PATENT DOCUMENTS

2007/0282665 A1* 12/2007 Buehler ............... G06Q 30/02
705/7.29
2007/0283004 A1* 12/2007 Buehler ............... G06Q 30/02
709/224
2010/0002082 A1* 1/2010 Buehler et al. ............... 348/159

* cited by examiner

PEOPLE SEARCHES BY MULTISENSOR EVENT CORRELATION

BACKGROUND

Technical Field

The present invention relates to video camera surveillance, and more particularly, to fraud prevention using video and other devices to understand, index and replay human activity.

Description of the Related Art

Fraud and shoplifting continue to persist as a main issue in retail businesses. One component of the problem is fraud by customers, specifically claiming a refund for a returned item, when they use a genuine receipt with an item that is just off the shelves, while keeping the item that they bought at home. Current solutions are very limited. Current solutions include store detectives or "human video surveillance".

Other problems, such as fraudulent injuries and compensation claims also remain a problem for retail establishments. Surveillance systems can provide some protection against these problems, but in many instances prove to be inadequate. Many consumers are aware of camera systems and take steps to avoid or defeat them.

SUMMARY

A surveillance system and method includes acquiring human activity data in a context and indexing the activity data in accordance with contextual conditions. The activity data is stored in a database in accordance with indices. Searches of the database are enabled using the indices to obtain previous human activity in the context.

A data indexing method includes acquiring activity data in a context, indexing the activity data in accordance with contextual conditions, storing the activity data in accordance with indices, and correlating an event with the activity data by using the indices to review the activity data in the context.

A data indexing system includes a plurality of acquisition devices configured to acquire activity data in a context. A surveillance engine is configured to process the activity data and derive search indices for the activity data. An index association engine correlates different observations using the indices, and a user-interface configured to conduct searches and present search results at a user station. The searches correlate stored activity data with newly acquired activity data at the user station based on the indices.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
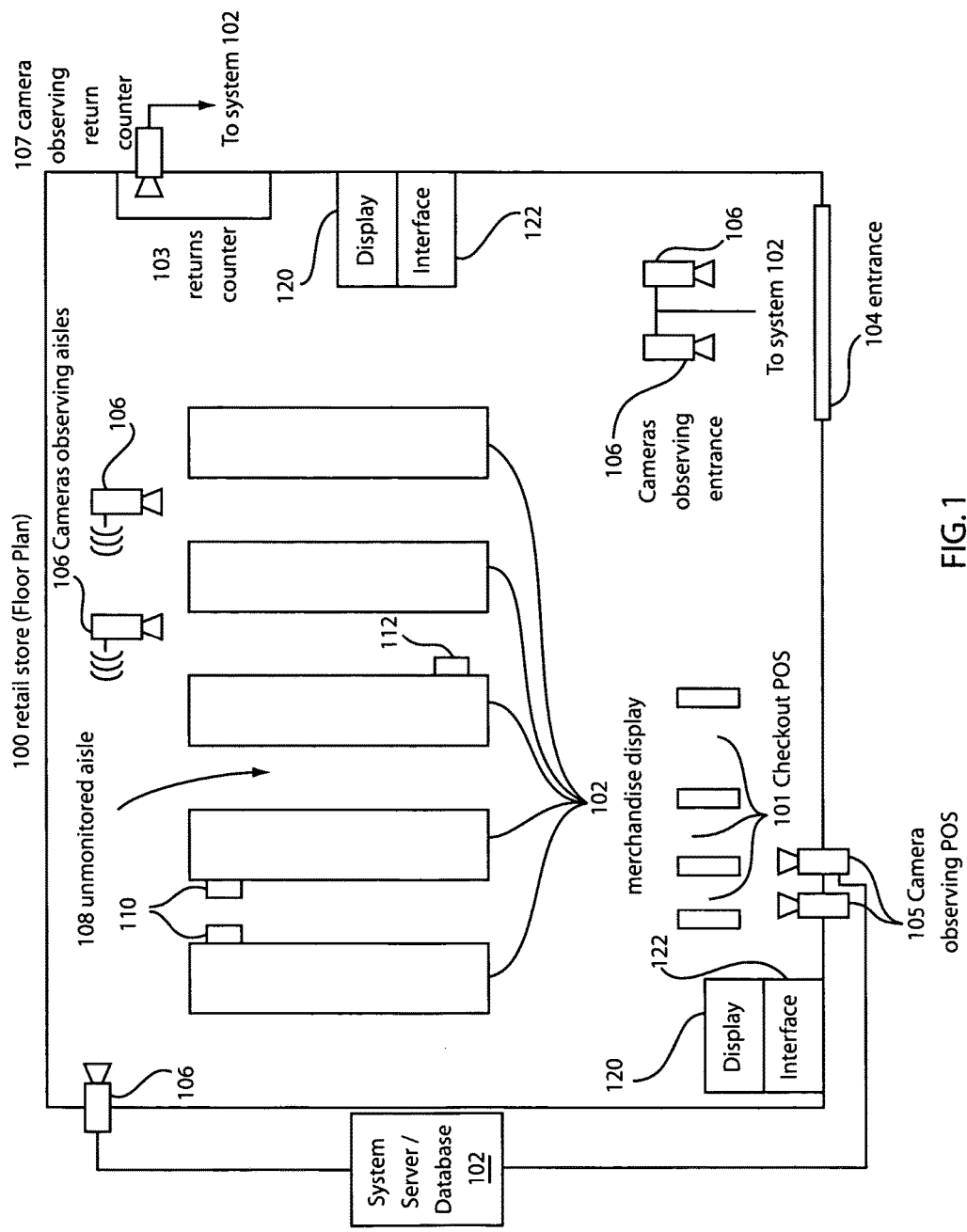
FIG. 1 is an illustrative depiction of a retail establishment floor plan showing an embodiment in accordance with present principles.

Embodiments in accordance with present principles are directed to the use of video cameras and other sensing devices to record activities in locations such as stores, public transport, streets, etc. Using video analysis software to index the video, events of interest can be retrieved using a variety of cues. In illustrative examples, some possible "events of interest" may include the following exemplary scenarios:

1) A customer enters a store, with a receipt for a product bought earlier, proceeds to pick up a new product of the same type, and then goes to "return" it at customer service. In this instance, the system semi-automatically or automatically finds video from the time that the customer entered the store, and can be used to show the employee that no refund should be given. The video can be presented to the customer, or saved for future use.

2) An employee or shopper claims to have had an accident in a certain location. Video is found of the claimed time/location and it can be verified whether such an accident took place.

3) When an accident is claimed, prior video may be found that indicates dangerous behavior on the part of a claimant or subsequent video may be found indicating behavior inconsistent with the claimed injury.

4) Other scenarios may benefit from the systems and methods as disclosed herein.

Current video surveillance systems may record video clips that are sought in the above examples, but one advantage of the present principles is that automatic processing, indexing and association of video makes finding these clips a relatively simple (and thus cost-effective) task that can quickly be carried out by a harried store clerk when a return is requested/claim is made.

The speed and simplicity mean at least that: (1) claims can be defeated immediately by demonstration of the video; (2) the density of video recording can be increased because it becomes feasible to search many more feeds; (3) the cost of searching is reduced, as the search is performed by computer, rather than by a person as in the present case; (4) the accuracy of the search is increased because human error and loss of attention are avoided.

Embodiments of the present invention can take the form of an entirely hardware embodiment, an entirely software embodiment or an embodiment including both hardware and software elements. In a preferred embodiment, the present invention is implemented in a combination of hardware and software. The software includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a floor plan for a retail store 100 is depicted to illustrate aspects in accordance with present principles. Major cost burdens in the retail industry come from theft, returns fraud and false injury/workman's compensation claims. Each of these problems can be addressed by a sophisticated video surveillance system 102.

In one embodiment, a retail store 100 is fitted with wired or wireless cameras 105, 106 and 107 at strategic locations, in particular at entrances/exits 104, returns counters 103, observing high value merchandise in merchandise display areas 102 and at cash registers 101. The video from the cameras 105, 106 and 107 is automatically processed by system 102 to extract salient features that can be used for indexing customer actions.

One system that can be adapted in accordance with present principles may include an IBM® Smart Surveillance System™, which extracts information such as the number of people visible, their actions, locations and paths or trajectories over time. System 102 employs cameras 105, 106 and 107 to extract appearance information (including e.g., view-normalized area and height), clothing color (e.g. a positional color histogram), facial appearance or any other feature or aspect needed for a given application. For example, other features that may be extracted from images may include, e.g., facial profile, ear or gait biometrics, behavior patterns, etc.

Additional sensors 110, 112 may be placed at the same locations covered by the cameras 105, 106 and 107 or other locations to augment the data that can be gathered about customers. Additional sensors 110, 112 may detect the presence of people using pressure pads, beam breakers, infra-red, PIR motion detection, or the position of shopping carts with RFID, magnetic sensors, active bat technologies, or any other technology which can provide useful information, etc.

The data from the sensors 110, 112 is communicated to a central, or distributed, index server in system 102, using mechanisms similar to those described in A. Hampapur, L. Brown, J. Connell, S. Pankanti, A. W. Senior, and Y.-L. Tian, *Smart Surveillance: Applications, Technologies and Implications*, IEEE Pacific-Rim Conference on Multimedia, Singapore, December 2003, which is incorporated herein by reference in its entirety.

This data is stored in a database and may be used for a variety of other purposes, including purposes other than those in accordance with this disclosure, such as store usage and traffic statistics.

Where the cameras' fields of view are contiguous, it may be desirable to track activity/people from one camera to another, using knowledge of the relative orientations of the cameras (for example, using ground-plane homographies, etc.) and/or knowledge of the entry and exit points from the fields of view and connections between them. In this way, it may be possible to maintain a continuous track of a person, to know that a person observed in a camera must necessarily be the same person observed in another camera, and knowing that the person has remained in view throughout. Even unmonitored areas 108 may be tracked based on correlated features entering and/or exiting such areas.

In accordance with present principles, employees of the retail store 100 preferably have access to displays 120 and interfaces 122 so as to permit access to the stored data and surveillance information that has been collected and indexed. In a particularly useful embodiment, a camera 106 present at the return counter 103 or a camera 105 at the checkout 101 may be employed to gather data of a next person on line. For example, clothing, face or other criteria can be gathered and compared to the database in system 102 such that information on this person is retrieved in advance or retrieved at the time service is provided.

For example, an individual enters a store with a red shirt on and dark sunglasses and not carrying anything. System 102 employs camera 106 at the entrance 104 to record this information. The person proceeds to pick up a large item from a merchandise display 102 and proceeds to the return desk 103, where the individual's appearance is again recorded. Additionally the individual would be recorded whenever in the field of view of any other store camera which might give continual recording throughout the individual's time in the store. When this individual gets to the return counter 103, a comparison of his features are employed to locate some or all of the other recordings of him available at the time he presents the merchandise for return. In this way, the clerk can easily determine that this individual entered the store empty handed and that an attempt to defraud the retail store is being made.

Figure 2:
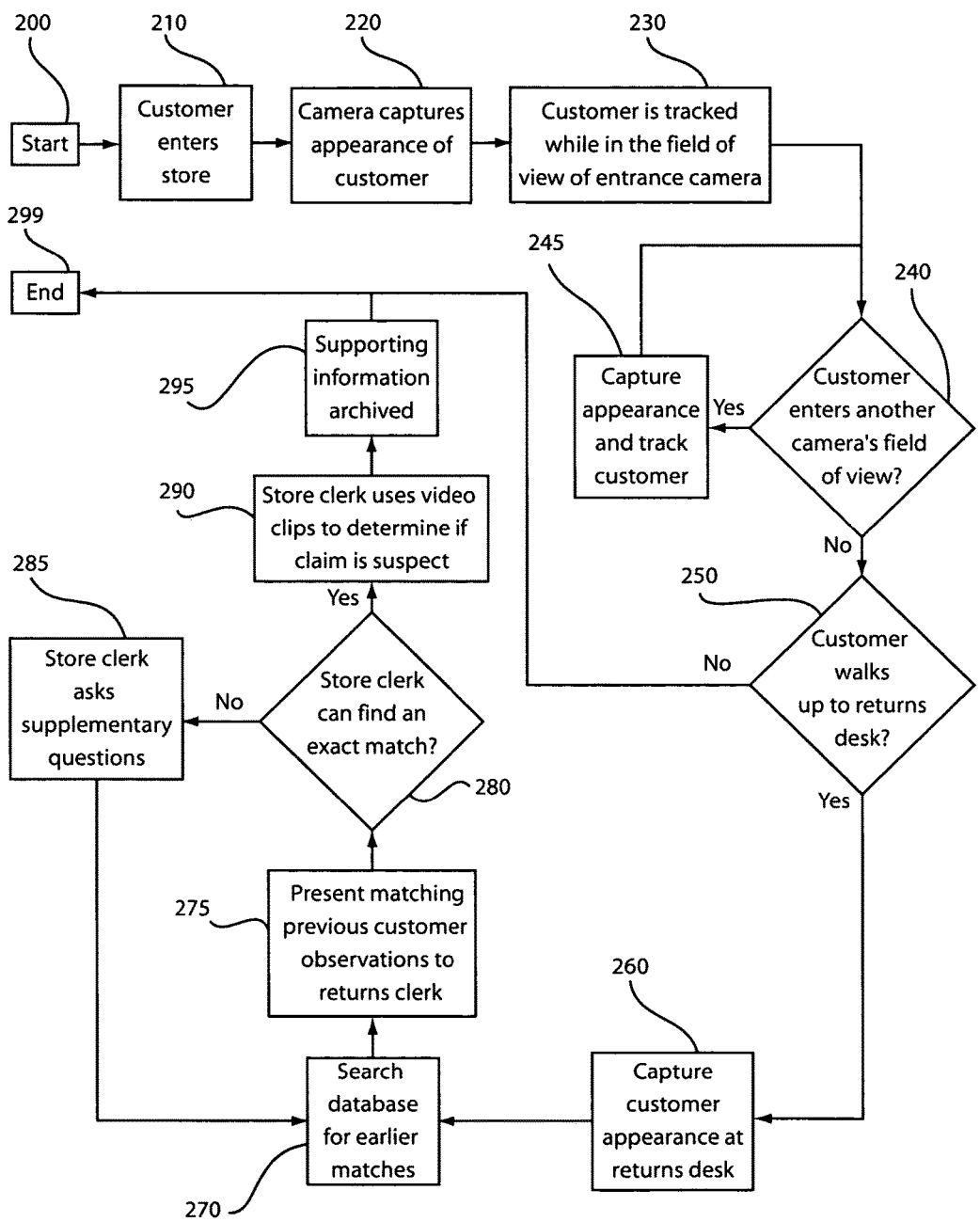
FIG. 2 is a block/flow diagram showing an illustrative surveillance method performed by the system in accordance with present principles.

Referring to FIG. 2, an illustrative scenario is presented to demonstrate aspects in accordance with present principles. A usage scenario is depicted for an illustrative embodiment in a scenario for returns fraud prevention. In block 200, a system (102) is provided with cameras placed throughout a location (e.g., a retail store). When a customer enters the store in block 210, the cameras record the event in block 220, and extract indices such as a location and appearance of the customer. The customer is tracked while in the field of view of the camera, and the index data is updated continuously in block 230.

In block 240, a decision is made as to the whether a customer enters another camera's field of view. If the customer enters another camera's field of view, the new camera captures the customer's appearance and indices. Then, the customer is again tracked and index information is updated in block 245. A customer may be tracked by zero, one or more cameras simultaneously.

In block 250, it is determined whether the customer approaches a service location (e.g., the returns desk). If the customer does not approach the returns desk then this portion of the program can terminate. If the customer does approach the returns desk, the customer's presence and appearance are captured at the returns desk and entered into the index in block 260. To help determine if a fraud is taking place, the store clerk can then use the system database to search, in block 270, for other indices that relate to the same person.

An index association engine 330 (FIG. 3), returns a set of matches in block 275 to the store clerk. Present matching customer observations are provided to the returns clerk for review. The matching process may use any available indices to find the best matches, using information such as the time, together with known temporal distributions (e.g. distribution of times taken to walk from a door to the returns counter), appearance (an image of the customer, face appearance or clothing color histogram), tracked path (to estimate route taken) plus any other sensor data, to limit the observed events at entrances, or other camera views, that might correspond to the current person at the returns counter.

In block 280, the store clerk can then go through the matches using a variety of techniques, such as through a graphical browser interface. In one embodiment, the matching results are summarized through the presentation of a keyframe accompanied by a small amount of textual information.

The keyframe may be automatically chosen at recording time to "best represent" the previous event—including but not limited to the clearest face image (according to criteria such as highest quality, most frontal, most neutral expression, best lighting) or the shot where the subject is portrayed at highest resolution.

A number of other criteria for choosing keyframes can be devised, including a combination of criteria. The keyframe may also be altered to highlight or augment the information included within it, for example to highlight or outline the subject of interest, draw the path of the person over time, inset an enlargement of the face, stamp a timecode or a digital watermark. The accompanying textual information may be null (to save screen real-estate) or include such useful information as the timestamp, camera location or orientation, identifying features of the individual, etc., and any of these features could be written into the frame or dynamically displayed, e.g., by 'mouse-over' when the cursor passes over the image.

The results could be reviewed in other manners, for example, by presenting the keyframes sequentially instead of spatially, or presenting an automatically extracted summary video of events of interest, or presenting a verbal description textually or aurally. While skimming the "browsing" representation, further information may be made available, by clicking or "mouse-over" of certain parts, to help the clerk determine a match. In one embodiment, clicking a keyframe opens a small popup window that shows the original video of the event and additional information.

Whatever the method used to examine the results, the clerk seeks a match in the returned results in block 280. If a match is found then, this can be verified by reviewing the additional information available. The additional information can also be used to support a determination, in block 290, of whether the transaction requested might be fraudulent or not, and appropriate action taken. Most of the action depends on store procedures.

In block 295, the system may support the archiving of the relevant information (to prevent a timed expiry that may automatically clean old, unimportant data from the database). This information may be stored in the existing database, specially packaged, or written out to another device (e.g. USB memory key, DVD-R, another computer, printout, video tape, etc.).

In the event that the clerk does not find any relevant events in block 280, a search may be extended in block 285 by reweighting the search/query criteria, changing the criteria (e.g. extending the time period searched), reordering the results, or narrowing the criteria with additional information. Additional information may become available because of movements of the customer (e.g., a better face shot) or by asking questions of the customer ("Which door did you come through?", "When did you get to the store?").

In many cases, the information included in the system may be of a sensitive, privacy-intrusive nature, and naturally the system may be enhanced by the deployment of privacy protecting technologies, such as encryption, access control privileges, data unbundling (separating different components of the information acquired into different streams that are stored, encrypted and accessed separately), and information masking, as described in the U.S. Patent Application No. 2003/0231769 A1, entitled, "Application Independent System, Method, and Architecture for Privacy Protection, Enhancement, Control, and Accountability in Imaging Service Systems", incorporated herein by reference in its entirety.

For use as evidence, the data captured may also need to be watermarked, timestamped, encrypted or cryptographically signed. In one embodiment, the system would incorporate these known technologies.

Figure 3:
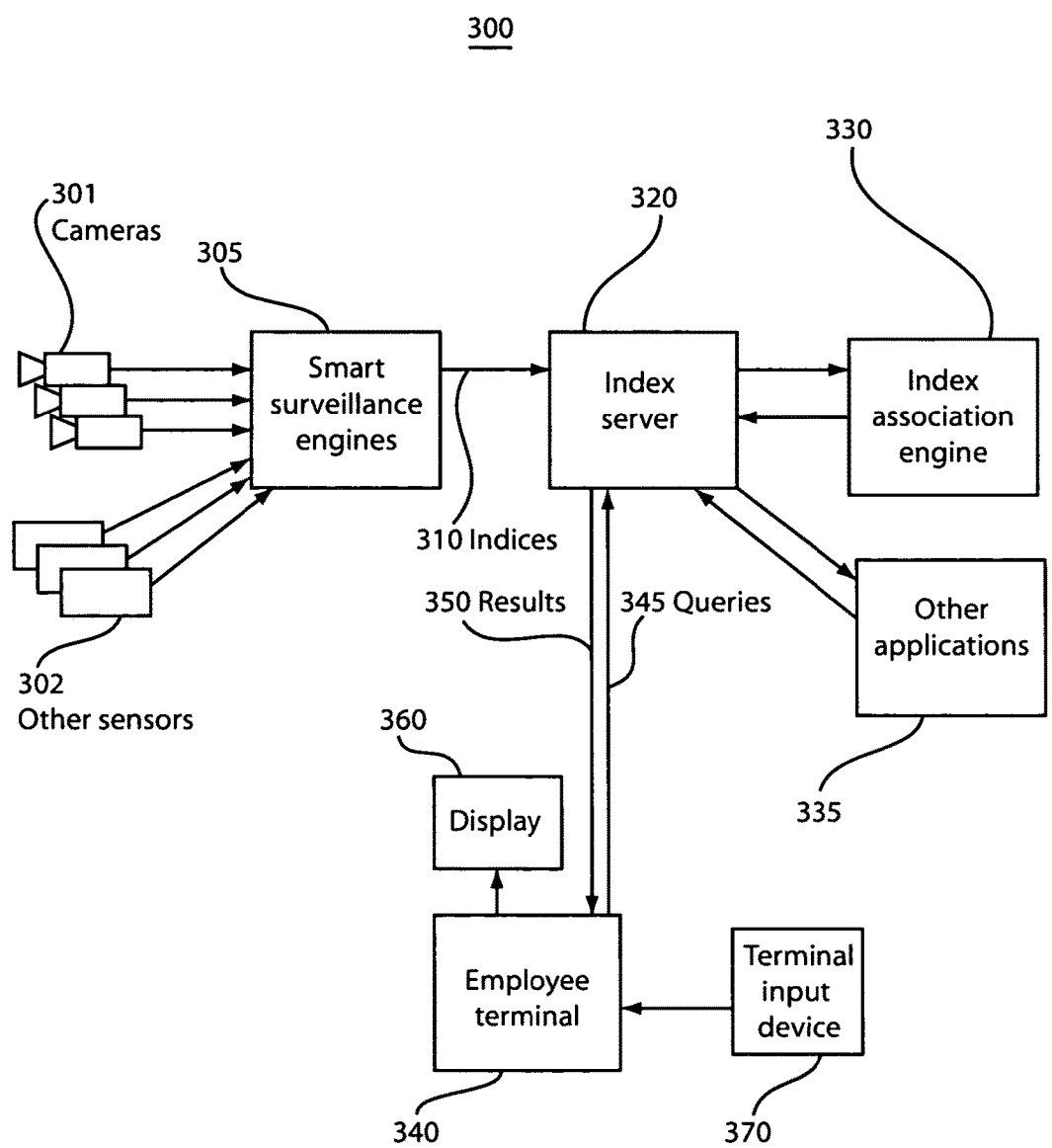
FIG. 3 is a block diagram illustratively showing components and flow of information between the components in a surveillance system in accordance with present principles.

Referring to FIG. 3, a video surveillance system 300 is illustratively shown in greater detail in accordance with one illustrative embodiment. System 300 can receive any input data from e.g., cameras, streaming content sensors etc. In the embodiment shown, cameras 301 and sensors 302 are placed at strategic locations, e.g., at entrances, exits, returns counters, observing high value merchandise, at cash registers, etc. The video from the cameras 301 is automatically processed by one or more smart surveillance engines 305 to extract salient features or indices 310 that can be used for indexing customer activity.

Surveillance engines 305 extract information such as the number of people visible, their locations and path over time, etc. In addition, appearance information is recorded including view-normalized area, height, clothing color, e.g. a positional color histogram, facial appearance, facial profile, ear or gait, biometrics, speed, time of observation, color, anthropometric measurements, biometric identifiers, etc.

Additional sensors 302 may be placed at the same locations covered by the cameras 301 or other locations to augment the data that can be gathered about people. Additional sensors 302 may include pressure pads, beam breakers, infra-red, PIR motion detection, RFID, magnetic sensors, active bat technologies, etc.

Index data 310 from the cameras 301 and sensors 302 is communicated to a central, or distributed, index server 320. The data is stored by the index server 320, and may be used for a variety of other purposes or applications 335, e.g., store usage, traffic statistics, forensic analysis, etc.

A continuous track of a person is preferably maintained to know that a person observed in a camera must necessarily be the same person observed in another camera, and knowing that the person has remained in view throughout. A user can make searches on the data at an employee terminal 340. Searches are entered at an input device 370, e.g., a mouse and/or keyboard, and are sent in the form of queries 345 to the index server 320. Index server 320 uses an index association engine 330 to carry out the search, and return results 350, which are displayed on an output device or display 360 at the user's terminal 340. Index association engine 330 may associates separate observations (e.g., in real-time while the individual remains in the retail establishment). These observations are correlated with other observation and events by using the indices in the context.

It should be appreciated that numerous modifications and other embodiments may be devised by those skilled in the art. Additionally, feature(s) and/or element(s) from any embodiment may be used singly or in combination with other embodiment(s).

Having described preferred embodiments for multisensor event correlation for retail fraud prevention (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A data indexing method, comprising:
   acquiring activity data characterizing activities of an individual in a context;
   indexing the activity data in accordance with contextual conditions;
   associating separate observations of the individual using the indices;
   storing the activity data in accordance with indices;
   correlating a customer service claim by an individual with the activity data by using the indices, including activity data that tracks the individual in unmonitored areas based on correlated features entering or exiting such areas;
   locating activity data, based on the indices, that shows the individual acting in a manner inconsistent with the customer service claim, wherein the located activity data shows video of the individual at a claimed time and place of an accident; and
   displaying the correlated activity data to review the activity data in the context of the customer service claim and to aid in determining whether the customer service claim is fraudulent.

2. The method as recited in claim 1, wherein acquiring activity data includes employing at least one of sensors and cameras.

3. The method as recited in claim 1, wherein associating separate observations is performed while the individual remains in the retail establishment.

4. The method as recited in claim 1, further comprising enabling searches of a database storing the indices and conducting the searches to prevent one of returns fraud by an individual and insurance claim fraud.

5. The method as recited in claim 1, wherein the indices include one or more of: facial appearance, speed, time of observation, color, anthropometric measurements, gait, biometric identifiers.

6. The method as recited in claim 1, wherein the indices include data from one or more of an RFID tag, a pressure pad, a motion sensor, a beam breaker, a local positioning system.

7. The method as recited in claim 1, further comprising tracking an individual in the context to provide a history of the individual's activities within the context.

8. The method as recited in claim 1, further comprising archiving the activity data in accordance with the indices.

* * * * *